May 31, 1960   J. V. WILLIFORD, JR   2,939,025
ELECTRIC MOTOR
Filed Jan. 10, 1955   2 Sheets-Sheet 2
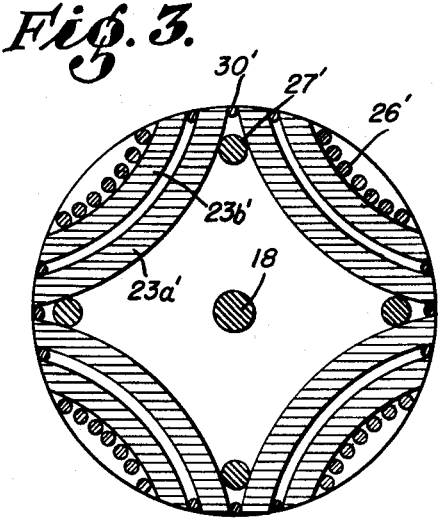
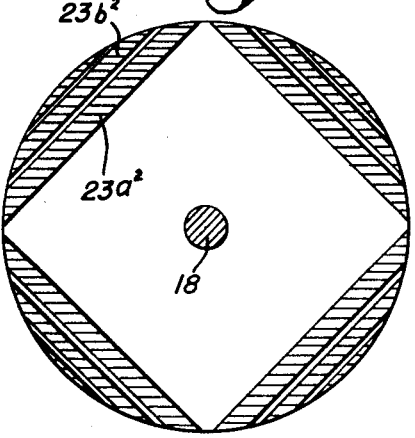
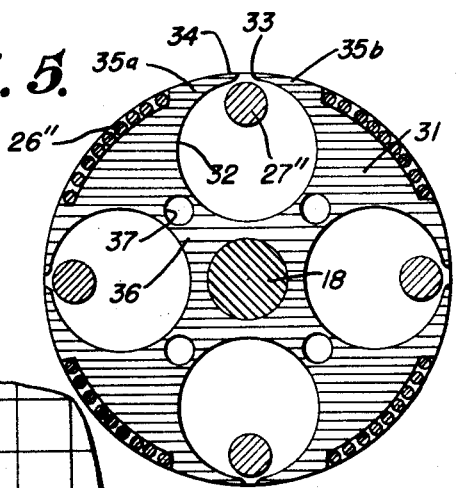
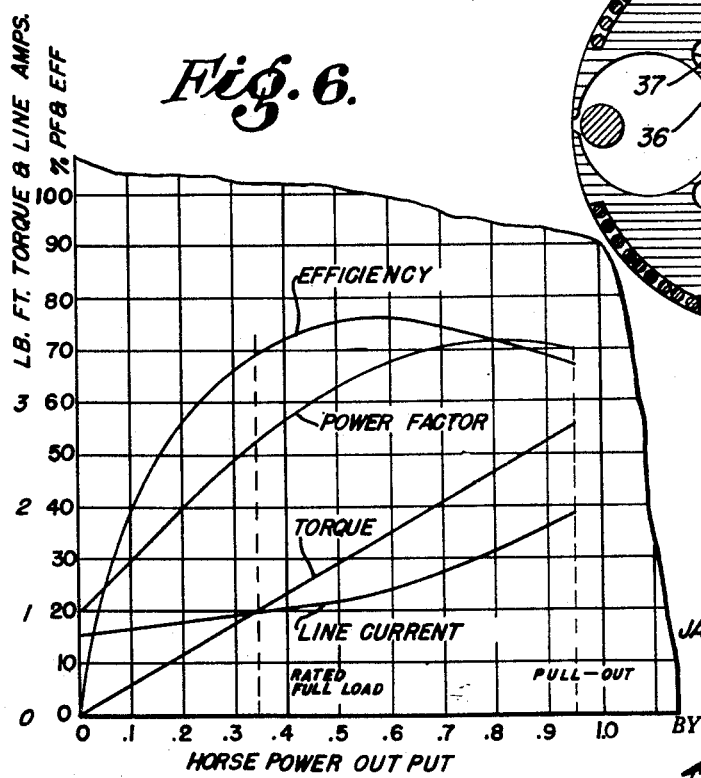
JACOB V. WILLIFORD, JR.
INVENTOR.

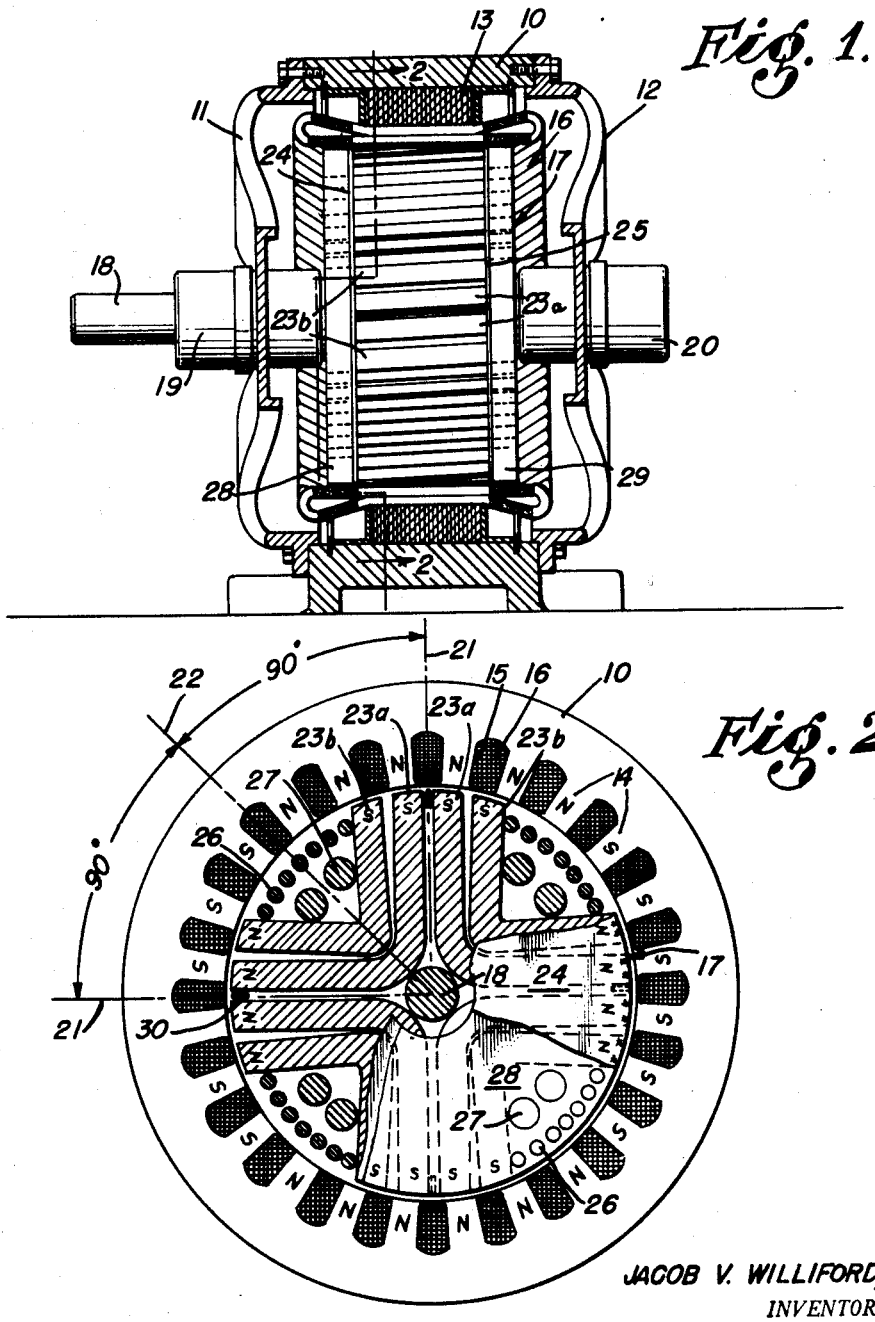

United States Patent Office 2,939,025
Patented May 31, 1960

2,939,025
ELECTRIC MOTOR
Jacob V. Williford, Jr., Downey, Calif., assignor, by mesne assignments, to Lido Land Co., Los Angeles, Calif., a copartnership
Filed Jan. 10, 1955, Ser. No. 480,643
4 Claims. (Cl. 310—261)

The present invention relates generally to electric motors and/or generators, and is more particularly concerned with alternating current motors and generators of the synchronous type, which do not require direct current excitation, or rely upon the use of permanent magnets for producing unidirectional magnetic rotor field poles as embodied in conventional motors and generators.

Heretofore, motors of this type have been exemplified principally by motors conventionally known as hysteresis motors and reluctance motors. Such motors have operating characteristics which limit their application to installations where only nominal power is required, and where efficiency of operation does not become a material factor. For example, such motors are usually limited to the operation of clock, phonograph and similar low power devices.

The present invention seeks to provide a synchronous motor of the foregoing general type, but which will have improved operating characteristics with respect to pull-in torque, pull-out torque, efficiency, etc., and which is capable of being utilized and economically produced in the integral horsepower ratings.

A further object of the invention is to provide a synchronous motor having induced rotor poles; which has a relatively high and increasing torque at pull-in; which has a high pull-out torque; and wherein fluctuation in line voltage has comparatively little effect on synchronous operation under full load and usually rated overload condition.

Another object of the herein described invention is to provide an unexcited synchronous motor having a rotor so constructed that the ratio of the quadrature axis reluctance to the direct axis reluctance will be greater than in conventional designs, thereby providing higher pull-in and higher pull-out torques, as well as additional desirable operating characteristics.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Fig. 1 is a vertical longitudinal section through a motor or alternator embodying the features of the present invention, the rotor being shown in elevation;

Fig. 2 is a transverse sectional view showing the cooperative relationship of the stator and rotor element, parts being cutaway to show details of the rotor, taken substantially on line 2—2 of Fig. 1;

Figs. 3, 4 and 5 are views respectively diagrammatically illustrating modified rotor constructions according to the present invention; and Fig. 6 is a graph showing certain of the operating characteristics of a motor constructed in accordance with the present invention.

Referring now generally to the drawings, a motor constructed according to and embodying the basic principles of the present invention is illustrated in Fig. 1.

The motor comprises a conventional stator frame 10 to which the usual end yokes 11 and 12 are secured by appropriate means. The stator frame serves as a mounting for field laminations 13, these laminations being fabricated by punching or otherwise to define spaced stator teeth 14 which cooperate to form circumferentially spaced slots 15 for receiving the conductors which make up the stator winding as generally indicated by the numeral 16.

Cooperatively associated with the stator of the motor is a rotor assembly, as generally indicated at 17, the rotor assembly being supported upon a suitable shaft 18 having its opposite ends supported in appropriate bearings 19 and 20 which are respectively supported in the end yokes 11 and 12.

The stator is of conventional construtcion and may be provided with a single phase or multiphase winding according to the type of motor desired. As illustrated in Fig. 2, the stator is shown as being of four pole construction, and provided with a three-phase winding. In the illustrative embodiment, the direct axes of each pole is indicated by the numeral 21, the direct axes of adjacent poles being 180 electrical degrees apart, while the quadrature axis midway between the direct axes is indicated by numeral 22, the quadrature axis being positioned 90 electrical degrees from the direct axis.

It has been determined that an unexcited synchronous motor will develop torque providing its rotor is constructed with salient poles, and that torque will be developed according to the expression:

$$T = KV^2 \frac{(X_d - X_q)}{2 X_d X_q} \sin 2S$$

Where:

T is the torque in any convenient unit
K is a constant depending upon the size and design of motor and the units used
V is the line voltage
$X_d$ is the direct armature reactance
$X_q$ is the quadrature armature reactance
S is the rotor displacement angle in electrical degrees (torque angle)

Since the direct axis armature reactance is dependent upon the reluctance of the magnetic path on the direct axis between adjacent poles, it will be seen from the above equation that the reluctance along the direct axis is low since any magnetic path therein will consist largely of soft steel. A low reluctance path results in high inductance and consequently the direct armature reactance is high.

On the other hand, the magnetic path along the quadrature axis is of high reluctance, since a substantial part of the path will be in air, as will hereinafter be explained. Consequently, the inductance is low and the quadrature armature reactance is low.

Upon further consideration of the above equation, it will be apparent that the greater the ratio between the reluctance of the quadrature axis to the reluctance of the direct axis, the greater will be the torque which can be developed, and it is with this objective in mind that the rotor of the motor of the present invention has been constructed. Accordingly, where it has only been possible in conventional motors to secure a ratio in the order of 1.5:1, in the herein described invention, it has been possible to obtain ratios in the order of 2:1 to substantially 4:1.

A rotor assembly of one construction for carrying out the present invention is shown in Fig. 2. In this construction the magnetic flux paths through the rotor from one pole of the stator to an adjacent stator pole is accomplished by providing pole forming bars or elements of magnetic material such as soft iron.

In the arrangement of Fig. 2, these elements, are indicated by numerals 23a and 23b and are of V-shaped construction. These elements are mounted in nested relation and magnetically separated so as to constitute separate magnetic paths. It will be observed that the elements are mounted so that the adjacent legs of elements 23a lie on opposite sides of a main axis of a stator pole, while adjacent legs of elements 23b are positioned outwardly on opposite sides of the legs 23a. Thus, at each stator pole, the four adjacent ends of the elements 23a and 23b extend over a stator pole face while two of the elements have their opposite ends associated with an adjacent pole face and the other two elements with their opposite ends associated with an adjacent pole face diametrically opposite. This results in a split pole construction, wherein the ends of the elements 23a and 23b cover approximately one-half of all the stator teeth at any instant. The elements 23a and 23b are retained in proper assembled relation by being welded to associated end discs 24 and 25 of nonmagnetic material. As thus arranged, it will be apparent that a low reluctance path is formed on the direct pole axis, while a high reluctance path is formed on the quadrature axis, thereby fulfilling the conditions of the formula to obtain high torque operating characteristics.

The rotor is also provided with squirrel-cage windings by which the starting torque and pull-in torque are controlled. In the V-space between the opposite ends of each element 23b, there are provided a plurality of relatively high resistance copper conductors 26 which are positioned near the rotary periphery so as to exert a maximum effect during starting, but lose some of their effectiveness as synchronous speed is approached.

The pull-in torque for bringing the rotor into synchronism is accomplished by providing an additional squirrel-cage winding which is shown as being composed of low resistance conductors 27 which are positioned inwardly of the conductors 26 at such depth that they will not develop much torque during starting due to their high reactance at line frequency, but as the rotor approaches synchronous speed, the torque created becomes a maximum. The ends of the conductors 26 and 27 are anchored in end discs 28 and 29 in such a manner as to form a current conducting circuit around each pole of the rotor which coacts with the stator field to induce poles in the rotor.

At each rotor pole face, between the ends of elements 23a, there is introduced one or more copper conductors 30 of high resistance. These conductors function to minimize hunting at synchronous speed, when the motor is operating under no load conditions. This operating condition is also further overcome by skewing or spiralling the end edges of the elements 23a and 23b in accordance with conventional practice, and which also minimizes magnetic noise.

The operation of the motor as just described will now be briefly considered. The rotor is started in conventional manner and by the aid of the squirrle-cage windings is brought into synchronism with the rotating stator field.

With no external load on the motor, and neglecting rotational losses, the rotor aligns itself with the rotating field such that the direct axis of the rotor is in line with the axis of the rotating field, as shown in Fig. 2, and due to the magnetic attraction of the rotating field for the rotor poles, the rotor is caused to rotate at the same speed as the magnetic field of the stator.

As thus positioned, it will be seen that the pole face forming edges of the elements 23a lie virtually directly under the stator teeth with the strongest magnetomotive force at any moment, and provide a path of low reluctance from adjacent north pole to south pole teeth in each pole section of the stator. Likewise, the pole forming faces of the elements 23b lie in the same relative position under the next strongest tooth of each set of stator teeth comprising one of the poles of the stator, and function in the same general manner as the longer elements, and thus contribute to an increase in the strength of the magnetic lock between the stator and rotor during operation at synchronous speed. In addition, the shorter-length elements 23d decrease the reluctance of the rotor, thereby decreasing the magnetizing current and improving the power factor.

As load torque is applied to the shaft at synchronous speed, any movement of the rotor with respect to the rotating magnetic field of the stator will be in a direction opposite to the direction of the rotation of the magnetic field. The extent of this movement at synchronous speed may be termed "torque angle" of the rotor. At no load, the torque angle is esentially zero, although it must have a small value to provide sufficient torque to overcome the rotational losses of the rotor. As the load is increased, the torque angle increases until it reaches 45 electrical degrees, at which point maximum torque is reached. If the load is still further increased, the torque angle increases beyond 45 electrical degrees, but the developed torque decreases and the motor pulls-out of synchronism.

Referring now to Fig. 6, actual performance test curves are shown for a motor constructed according to the present invention. These curves particularly show excellent efficiency and power factor characteristic, and also that there is an increasing torque from rated full load to pull-out, as compared with the undesirable characteristics which are embodied in reluctance and hysteresis type motors, and which make them unsuitable for relatively large power applications.

Referring now to Figs. 3, 4 and 5, these illustrations respectively disclose modified forms of construction which embody the basic principles of the present invention.

In the arrangement shown in Fig. 3, the pole forming elements 23a' and 23b' are made of arcuate form longitudinally, rather than V-shaped. Such construction provides greater space adjacent the shaft, but works upon the same principle as the rotor construction shown in Fig. 2. In this arrangement, copper conductors 30' are placed between the ends of the elements to stablize and overcome hunting during no load operation. In this arrangement, the conductors 27' are placed within the split pole adjacent the ends of elements 23a'.

In Fig. 4, the elements which form the magnetic path, as indicated by numerals 23a2 and 23b2 are of straight construction rather than arcuate or V-shaped as previously described.

Referring now to Fig. 5, a somewhat different construction is utilized in which the rotor is built up from punched laminations 31. These laminations are formed with axially extending symetrically arranged passages 32 which are provided with a peripheral slot 33 which is positioned between the sides of a peripheral polar projection 34, the slot dividing this polar projection into a split pole face consisting of portions 35a and 35b.

The passages 32 are separated by web portions 36, each of these web portions having a restricted cross section formed in each case by an opening 37. Thus, the restricted cross-section of the web introduces a high reluctance magnetic path on the quadrature axis.

The starting squirrel-cage winding 26" is shown in this case as being positioned between the polar projections 34, while the conductors 27" forming the pull-in squirrel-cage winding for synchronizing purposes are respectively located in the passages 32, below the slot 33 in each case.

Although the present invention has primarily been described in connection with its application to a motor, it will be appreciated that the construction is also susceptible of use in a generator of alternating current and will as so used function to deliver at any power factor a load at exact frequency.

Various modifications may suggest themselves to those skilled in the art without departing from the spirit of my invention, and, hence, I do not wish to be restricted to the specific forms shown or uses mentioned, except to the extend indicated in the appended claims.

I claim:

1. In a synchronous electric motor having a stator structure forming a mount for field laminations defining stator teeth and including a winding arranged to provide a rotating electrical field, a rotor structure, comprising: a plurality of bars positioned to form magnetic flux paths between stator poles of opposite polarity, the ends of the bars at each stator pole being grouped to define a rotor split pole, and these bars having their other ends divided and positioned to form portions of adjacent rotor poles, said bars having a width equal to that of about eight of the field laminations and therefore about equal to the width of a stator tooth.

2. In a synchronous motor having a laminated stator slotted to define teeth and including a winding in the slots to provide a rotating n-pole field, a rotor structure, comprising: $n$-groups of a plurality of relatively thick spaced plates of magnetic material and generally arcuate in cross-section having their apexes arranged adjacent and parallel to the rotor axis with their end surfaces lying in the rotor surface at $n$-areas around the rotor whereby the plates form magnetic flux paths between adjacent stator poles of opposite polarity, the ends of the plates at each stator pole being spaced to form a split pole, and these plates of each split pole having their other ends grouped and positioned to form portions of adjacent poles, said plates each having a thickness equal to about the thickness of a stator tooth, a squirrel cage winding comprising $n$-groups of conductor bars arranged about the rotor with a group between each pair of rotor poles, each group having a plurality of high resistance bars placed near the rotor periphery and a plurality of low resistance bars located nearer the rotor shaft, where $n$ is the number of stator poles.

3. A synchronous motor rotor having a shaft and four salient poles, each pole comprising two pairs of substantially thick spaced magnetic plates arranged parallel to the rotor axis, each pair of plates which form one-half of each pole being integrally connected to an adjacent pair of plates of an adjacent pole by substantially arcuate spaced segments arranged to present their concavities toward the rotor surface, a pair of axially spaced electrically conductive disks supporting the magnetic plates on the shaft, groups of electrical conductors connecting said disks, and arranged one group in each concavity, each of said groups of conductors comprising a plurality of high resistance bars near the rotor periphery and a plurality of low resistance bars spaced from said periphery.

4. A synchronous motor rotor having a shaft and four salient poles, each pole comprising two spaced pairs of substantially thick spaced magnetic plates arranged generally parallel to the rotor axis, a pair of plates on one side of each pole being magnetically integrally connected to an adjacent pair of plates on an adjacent pole by a pair of substantially arcuate spaced plates having their concave surfaces facing outwardly, a squirrel cage winding on the rotor comprising a pair of axially spaced disks of electrically conductive material on the shaft and connected together by groups of conductor bars, said groups of bars being located one group in each concavity of the outwardly facing arcuate plates, each group of bars comprising a plurality of high resistance bars near the rotor periphery and a plurality of low resistance bars under the high resistance bars.

References Cited in the file of this patent

UNITED STATES PATENTS 1,551,271    Slepian _____ Aug. 25, 1925